United States Patent [19]
Ogawa et al.

[11] Patent Number: 5,268,894
[45] Date of Patent: Dec. 7, 1993

[54] APPARATUS FOR REPRODUCING INFORMATION BY DELAYING AND ATTENUATING A REPRODUCING SIGNAL

[75] Inventors: Yoichi Ogawa; Yoshinori Shikano, both of Tokorozawa, Japan

[73] Assignee: Pioneer Electronic Corporation, Tokyo, Japan

[21] Appl. No.: 49,597

[22] Filed: Apr. 20, 1993

Related U.S. Application Data

[63] Continuation of Ser. No. 681,816, Apr. 8, 1991, abandoned.

[30] Foreign Application Priority Data

Apr. 13, 1990 [JP] Japan .................. 2-98000

[51] Int. Cl.⁵ .................................. G11B 7/00
[52] U.S. Cl. ............................ 369/124; 369/54
[58] Field of Search ........... 369/44.35, 44.34, 44.25, 369/44.29, 124, 100, 110, 111, 32, 54, 48, 47, 60; 250/201.5

[56] References Cited

U.S. PATENT DOCUMENTS

| | | | |
|---|---|---|---|
| 4,849,953 | 7/1989 | Nomura et al. | 369/44.33 |
| 4,866,688 | 9/1989 | Ohtaka et al. | 369/100 |
| 4,924,447 | 5/1990 | Fuji et al. | 369/124 |
| 4,961,182 | 10/1990 | Saito et al. | 369/124 |
| 5,020,046 | 5/1991 | Ueda | 369/60 |

*Primary Examiner*—Aristotelis Psitos
*Assistant Examiner*—Thang V. Tran
*Attorney, Agent, or Firm*—Sughrue, Mion, Zinn, Macpeak & Seas

[57] ABSTRACT

An apparatus for reproducing information is adapted to irradiate a laser beam onto a recording surface of an information recording optical disk on which record information are written to transform a reflected laser beam from the recording surface to an electric signal by using a photoelectric transducer, thus to reproduce record information on the basis of this electric signal. The apparatus has a signal delayer for delaying an electric signal by a predetermined time, a signal attenuator for attenuating the delayed signal, and a signal subtracter for subtracting the delayed signal from the electric signal to output a subtraction signal.

6 Claims, 4 Drawing Sheets

FIG. 2
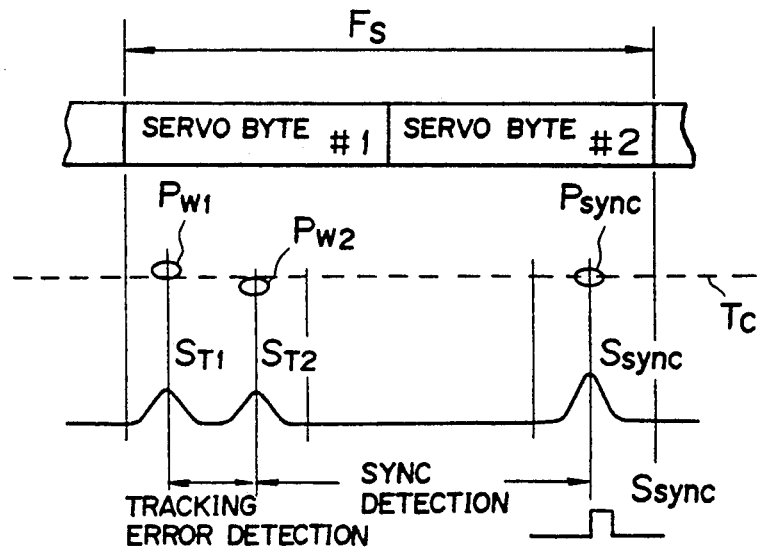
FIG. 3(a)
FIG. 3(b)
FIG. 3(c)
FIG. 3(d)
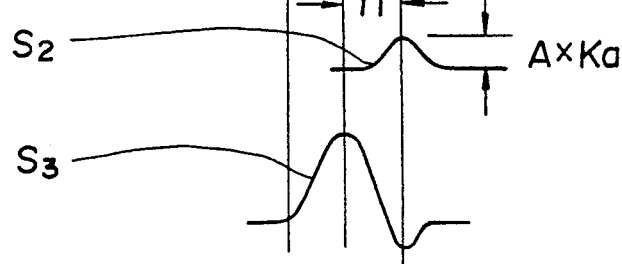

APPARATUS FOR REPRODUCING INFORMATION BY DELAYING AND ATTENUATING A REPRODUCING SIGNAL

This is a continuation of application Ser. No. 07/681,816 filed Apr. 8, 1991 now abandoned.

BACKGROUND OF THE INVENTION

The present invention relates to an apparatus for reproducing information, and more particularly to an apparatus for reproducing information, which is adapted to optically read record information from a recording medium such as an optical disk, etc.

As an medium for recording various digital data, music information, image information, or the like, optical disks are known. Since writable optical disks among these optical disks can be subjected to write once record information on the user side, the demand therefor is being increased. The write once read optical disks of these writable optical disks are called a WORM (Write Once Read Multiple) optical disk or a DRAW (Direct Read After Write) optical disk. The write once read disks are such that information can be written thereonto only once. In this case, writing is carried out by converging a laser beam onto a recording surface to transform the laser beam to a thermal energy at the convergent point (very small area portion) to perforate the recording film by fusing action, etc. due to heat generated at that time to form signal pits, thus to write record information thereinto. At the time of this writing, record information is modulated in accordance with 4/15 modulation ($_{15}C_4$: 4 out of 15 code) method. Playback or reproduction of information thus recorded is carried out by irradiating a laser beam onto a recording track on a recording surface including signal pits formed in a manner stated above to apply photoelectric conversion to a reflected laser beam by using a photodetector to apply analog-to-digital (A/D) conversion to an electric RF signal (RF: Radio Frequency) thus provided thereafter to demodulate that digital signal by using a 4/15 decoder.

SUMMARY OF THE INVENTION

The problem with the above-mentioned write once read optical disk devices is that so called "prepits" and/or recording signal pits are unnecessarily prolonged or enlarged, resulting in the possibility that any reading error might take place due to prolongation and enlargement of those pits. The prepit indicates SYNC (synchronizing) pit and/or address information pit, etc. preformatted in the process of mastering of disk.

The cause to generate prolongation and enlargement of pits is considered as follows. With respect to prolongation and enlargement of prepits, it is pointed out that prepits are formed large to some extent in the process of mastering of disk in order to correctly read prepit information even at the time of high speed search thereof. On the other hand, concerning prolongation and enlargement of recording signal pits, it is pointed out that a power of a laser beam at the time of carrying out writing in an optical disk device is set to a relatively large value so that a sufficient signal amplitude can be provided at the time of playback.

On the other hand, the problems with the reproducing or playback system of the optical disk device are as follows. In the case where the optical MIF (Modulation Transfer Function: Spatial Frequency Characteristic, i.e., frequency characteristic of the optical system) of the optical pickup, or the frequency characteristic of the processing system for a playback signal is not appropriate, the reading signal becomes dulled, so an unfavorable phenomenon takes place as if pits were further elongated or enlarged. As a result, elongation and enlargement of pits produced at the time of mastering of disk or at the time of recording may be further emphasized. In the case of the recording/playback system using a procedure to select several bits in order of the bit level from channel bit data in the read RF signal, e.g., as in the 4/15 modulation/demodulation system, elongation and enlargement of signal pits produced in a manner described above may lead to the state where channel bits to be selected are replaced with each other. Such a replacement of channel bits may give rise to any error in the logic level of a bit stream.

An object of this invention is to provide an apparatus for reproducing information wherein even in the case where signal pits recorded on a write once read optical disk are elongated and/or enlarged, original correct data can be reproduced.

In carrying out this invention in one preferred mode, we utilize an apparatus for reproducing information, which is adapted to irradiate a laser beam onto an information recording medium where recording information are written to transform a reflected laser beam from the recording surface to an electric signal $S_1$ by using photoelectric transducer to reproduce record information on the basis of the electric signal $S_1$, wherein there is employed a circuit configuration to delay the electric signal $S_1$ by a predetermined time by using signal delaying means to attenuate a delayed signal by using signal attenuating means to subtract the delayed and attenuated signal $S_2$ from the electric signal $S_1$ by using signal subtracting means to output a subtracted signal $S_3$.

In accordance with the preferred mode of this invention, the signal delaying means delays, by a predetermined time, an electric signal $S_1$ provided by applying photoelectric conversion to a reflected laser beam from the recording surface of the recording medium. The signal thus delayed is attenuated into a signal $S_2$ having a predetermined amplitude level by using the signal attenuating means. The electric signal $S_1$ and the delayed and attenuated signal $S_2$ are inputted to the signal subtracting means. The signal subtracting means carries out a subtraction ($S_3 = S_1 - S_2$) between the both signals $S_1$ and $S_2$. As a result, the signal level of the falling portion of the electric signal $S_1$ is subtracted by a value corresponding to the signal level of the delayed and attenuated signal $S_2$. Thus, the electric signal $S_3$ thus subtracted has a narrow waveform in the time width. This is equivalent to the fact that a signal component corresponding to an enlarged portion of the signal pit is electrically removed.

As stated above, the preferred mode of this invention employs a circuit configuration adapted to subtract, from an electric signal which has been read, a signal provided by attenuating a delayed signal of the electric signal. As a result, the signal width of the electric signal can be narrowed. Thus, reading error produced by elongated and enlargement of signal pits produced in, e.g., a write once read optical disk can be suppressed.

BRIEF DESCRIPTION OF THE DRAWINGS

In the accompanying drawings:

FIG. 2 is a view showing a recording format in a servo field in the sampled servo system;

FIGS. 3(a-d) are view showing the shape of a signal pit written onto a written once read type optical disk and a waveform of a RF signal in the case where that signal pit is read;

DESCRIPTION OF THE PREFERRED EMBODIMENTS

Preferred embodiments of this invention will now be described with reference to the attached drawings.

Write Once Read Type Optical Disk

Prior to the description of an embodiment, for helping understanding of this invention, the outline of a write once read type optical disk as an information recording medium will be first described.

There is generally a tendency that optical disks are small-sized. In the case of a write once read type optical disk, "5.25 inches" (130 mm) size is becoming an international standard size. For the recording format, "continuous groove system (Type A Format)" and "sampled servo system (Type B Format)" are representative.

Figure 1:
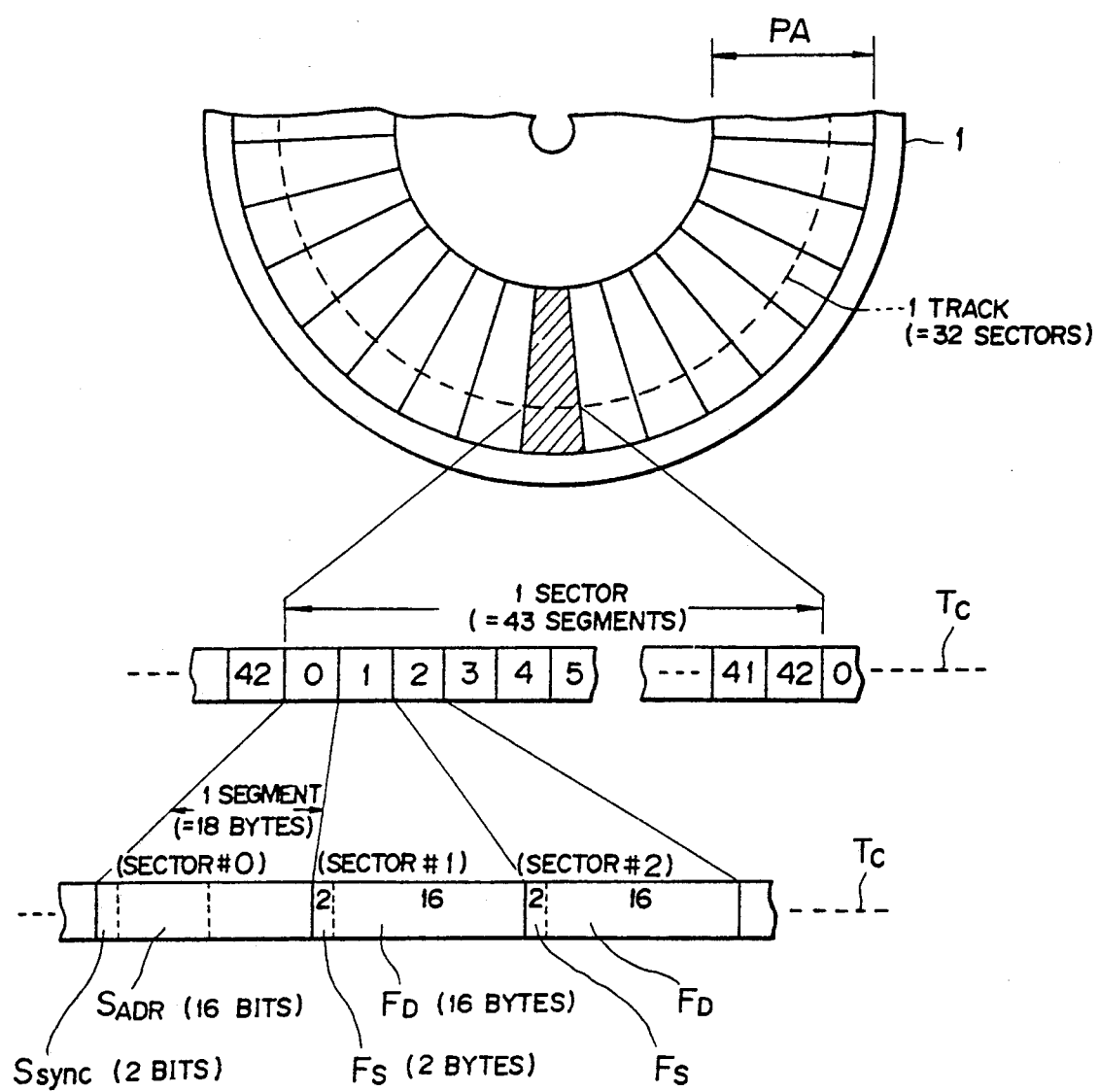
FIG. 1 is a view showing a recording format of a write once read optical disk of the sampled servo system.

The recording format of a write once read type optical disk of the sampled servo system is shown in FIG. 1. In the case of a write once read type optical disk of the sampled servo system, no pregroove (guide groove) is provided on the recording film of the write once read type optical disk, and servo fields are preformatted at 1376 portions in one track. This write once read type optical disk is characterized in that clocks for tracking error or recording/playback, etc. are generated by sampling by making use of such servo fields. As shown in FIG. 1, spiral signal tracks developed from the inner circumferential side to the outer circumferential side of a write once read type optical disk 1 are formed in the program area PA of the write once read type optical disk 1. One track is divided into 32 sectors. Each sector is comprised of 43 segments, and each segment is comprised of 18 bytes. At the initial segment #0 of one sector, a sector SYNC signal $S_{sync}$ (2 bits) for providing synchronization every sector and a sector address $S_{ADR}$ (16 bits) for indicating an address of the sector are preformatted. Such a preformatting is carried out in the process of mastering of the write once read type optical disk 1. Each of segments #1 to #42 is comprised of a field of 18 bytes in total of a servo field $F_s$ of 2 bytes and a data field $F_D$ of 16 bytes.

The recording format of the servo field $F_s$ is shown in FIG. 2. The servo field $F_s$ of 2 bytes is divided into two servo bytes #1 and #2 every each byte. Wobble pits $P_{W1}$ and $P_{W2}$ are performatted at the third and fourth bits of the servo byte #1, respectively. These wobble pits $P_{W1}$ and $P_{W2}$ are arranged in a manner that they are shifted on the left and right sides in a trace direction (radical direction of the write once read type optical disk 1) using the track center TC as a boundary, thus to carry out a tracking error detection on the basis of the difference between the light intensity of a reflected laser beam from the wobble pit $P_{W1}$ and that from the wobble pit $P_{W2}$. At the twelfth bit of the servo byte #2, a SYNC pit $P_{sync}$ is preformatted. The wobble pit $P_{W2}$ and the SYNC pit $P_{sync}$ are spaced from each other by 19 channel clocks length, and the portion therebetween is subjected to a mirror finish. For a time period corresponding to that portion, 19 channel clocks are counted to provide synchronization every respective segments, and focus detection is carried out for this SYNC detection period. Tracking signals $S_{T1}$ and $S_{T2}$, and a sector SYNC signal $S_{sync}$ provided by reading the above-mentioned servo field $F_s$ by using a laser beam are shown in FIG. 2.

Writing of Recorded Information Onto a Write Once Read Type Optical Disk

Writing of record information onto the write once read type optical disk 1 is carried out in the data field $F_D$ shown in FIG. 1. In writing record information, record information is modulated by the 4/15 modulation period. The signal thus modulated is written onto the recording film of the write once read type optical disk 1. It is to be noted that the wobble pits $P_{W1}$ and $P_{W2}$, and the SYNC pit $P_{sync}$ in the preformatted servo field $F_s$ are modulated by the 4/15 modulation method, and are thus formed.

In accordance with the 4/15 modulation method, each byte (8 data bits) in the data field $F_D$ serving as a user byte is divided into two sections every four bits, thus to convert respective 4 bits of higher order (MSN: Most Significant Nibble) and 4 bits of lower order (LSN: Least Significant Nibble) to 15 channel bits. Thus, 4 bits in total of two odd position bits among 15 channel bits on the MSN side and two even position bits among 15 channel bits on the LSN side are used as data bits. This relationship is symbolically expressed as follows:

$$2^8 \quad < \quad {}_{15}C_4$$

(256 bits)    (1365 bits)

On the other hand, writing onto the write once read type optical disk 1 is carried out by the optical method using a laser beam. A laser beam for writing is converged onto the recording film of the write once read type optical disk 1 through an optical system. The laser beam thus converged is transformed to a thermal energy at a very small area portion of the recording film to which laser beam is irradiated. By this thermal energy, the property of the recording film at the irradiated portion of the laser beam changes. The change of the property of the recording film means, e.g., fusion, or sublimation, etc. of the recording film. By this property change, the recording film is perforated. Holes thus formed serve as signal pits. Presence and absence of these holes correspond to data on the tracks.

Reproduction of Record Information

Reading of record information written in a manner stated above is carried out by detecting presence and absence of signal pits on the recording film. Reading of such record information is carried out by the optical method using a laser beam. A laser beam for reading is converged through the optical system onto the recording film. Presence and absence of signal pits on the convergent portion correspond to weakness and strength of an incident light of a reflected laser beam onto the photodetector. The photodetector applies photoelectric conversion to an incident reflected laser beam to output an electric signal. The amplitude of this electric signal corresponds to presence and absence of data bits written onto the write once read type optical disk 1. An electric signal thus read, i.e., a read RF signal is subjected to analog-to-digital (A/D) conversion in synchronism with a playback clock signal. The digital signal thus obtained is decoded into digital data of 8 bits by using a decoder of the 4/15 demodulation method, and is then outputted therefrom. It is to be noted that in the case where record information is, e.g., music information, this 8 bit data is subjected to digital-to analog (D/A) conversion for a second time. The analog signal thus obtained is amplified and is then outputted as an audio signal from a speaker, etc.

The shape of signal pits written onto the write once read type optical disk 1 and the waveform of a RF signal in the case where signal pits are read are shown in FIG. 3. In the case of the write once read type optical disk 1, as previously described, there are instances where signal pits may be elongated or enlarged. As compared to a normal pit $P_o$ (broken line), an actually written signal pit is as indicated by $P_1$ (solid line) (FIG. 3(a)). In the case where the enlarged pit indicated by the solid line $P_1$ has been read, the waveform of a RF signal becomes RF signal $S_{1E}$. The enlarged or swelled portion at the rear end portion of the solid line $P_1$ appears as it is on the signal waveform (FIG. 3(b)). In the case where such a RF signal $S_{1E}$ of the enlarged pits is subjected to D/A conversion with its waveform being unchanged, and is then subjected to 4/15 demodulation, reading error may be produced.

Figure 4:
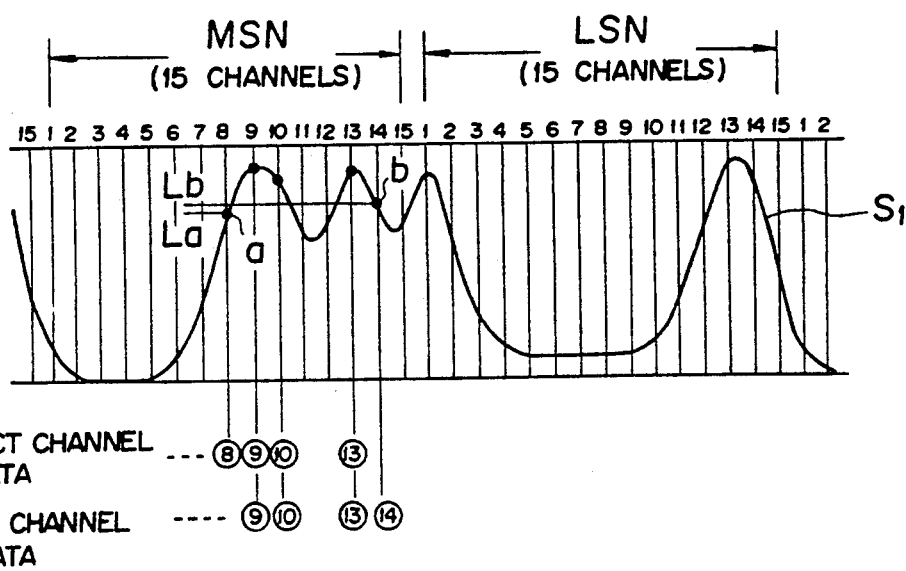
FIG. 4 is a view showing an example of a read RF signal in the case where an elongated signal pit is read.

Namely, an example of a read RF signal $S_1$ in the case where enlarged signal pits are read is shown in FIG. 4. In the case of 4/15 demodulation, 4 channel bits are selected in order of the signal level to provide input data for the A/D converter. At this time, if there exists a RF signal $S_{1E}$ of enlarged pits, combination of channel bits indicating a high level signal may change. In the case of FIG. 4, even if correct channel bits are $B_C$ of (8), (9), (10) and (13), error channel bits $B_E$ of (9), (10), (13) and (14) are outputted. The reason therefor is as follows. Since the waveform of the read RF signal $S_1$ corresponding to the channel bit (13) is swelled out by the swelled portion at the rear end of the signal pit as described above, the signal level $L_b$ of the read RF signal $S_1$ of the channel bit (14) is raised higher than the signal level $L_a$ of the read RF signal $S_1$ of the channel bit (8). As a result, the channel bit (8) is not selected, but the channel bit (14) is erroneously selected, resulting in an erroneous channel bit $B_E$. This invention has been made in order to solve the above-mentioned problems. Preferred embodiments of this invention will now be described.

First Embodiment

Figure 5:
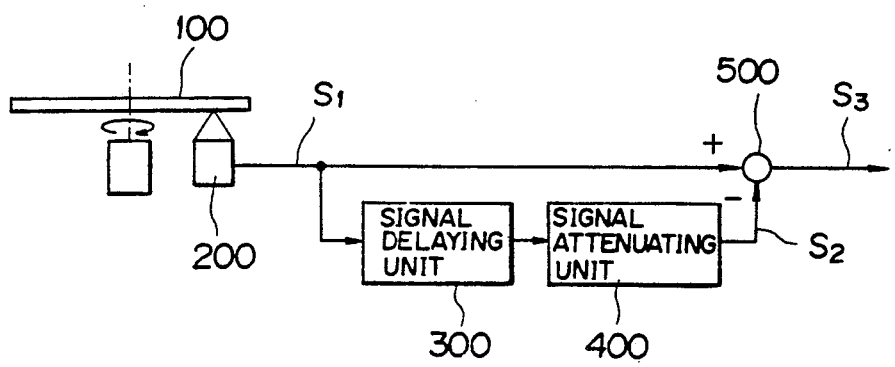
FIG. 5 is a diagram showing the configuration of a first embodiment of this invention.

The configuration of a first embodiment of an apparatus for reproducing information according to this invention is shown in FIG. 5. As shown in this figure, an apparatus for reproducing information of the first embodiment is adapted to irradiate a laser beam onto an information recording optical disk 100 where record information are written to transform a reflected laser beam from the recording surface to an electric signal $S_1$ by means of a photoelectric transducer 200 to reproduce or playback record information on the basis of the electric signal $S_1$. A signal delaying unit 300 delays the electric signal $S_1$ by a predetermined time. A signal attenuating unit 400 attenuates that delayed signal. A signal subtracting unit 500 subtracts a delayed and attenuated signal $S_3$ from the electric signal $S_1$ to output a subtracted signal $S_3$.

In accordance with this embodiment, the signal delaying unit 300 delays, by a predetermined time, an electric signal $S_1$ provided by applying photoelectric conversion to a reflected laser beam from the recording surface. The signal thus delayed is attenuated into a signal $S_2$ having a predetermined amplitude level by means of the signal delaying unit 400. The electric signal $S_1$ and the delayed and attenuated signal $S_2$ are inputted to the signal subtracting unit 500. The signal subtracting unit 500 carries out a subtraction ($S_3 = S_1 - S_2$) between the both signals $S_1$ and $S_2$. As a result, the signal level of the falling portion of the electric signal $S_1$ is subtracted by a value corresponding to the signal level of the delayed and attenuated signal $S_2$. The electric signal $S_3$ thus subtracted has a narrow waveform in the time width. This is equivalent to the fact that the signal component corresponding to an enlarged portion of the signal pit is electrically removed. As a result, occurrence of errors in reading can be suppressed.

Second Embodiment

Figure 6:
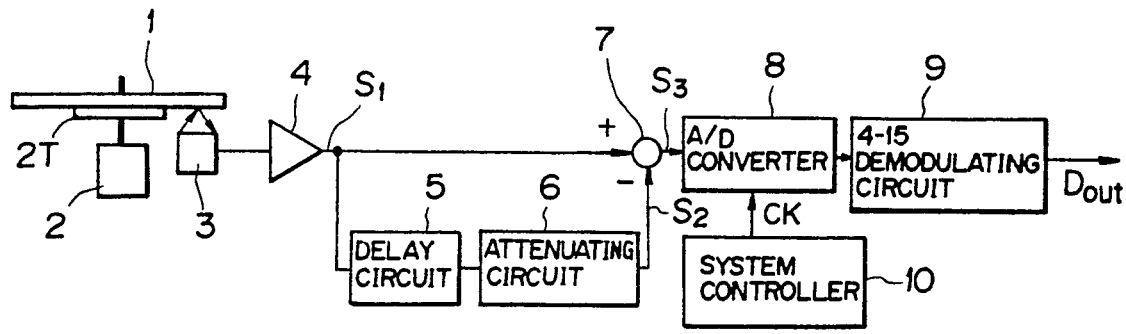
FIG. 6 is a diagram showing the configuration of a second embodiment of this invention.

The configuration of a second embodiment of an apparatus for reproducing information according to this invention is shown in FIG. 6. A write once read type optical disk 1 as an information recording medium is mounted on a turn table 2T, and is rotated at a predetermined number of rotations by means of a spindle motor 2. Along with this rotation, signal pits on the recording film provided on the write once read type optical disk 1 are read by means of a photodetector 3. Reading by the photodetector 3 is carried out by an optical method using a laser beam. The photodetector 3 outputs written information, i.e., a read RF signal corresponding to presence and absence of signal pits. The read RF signal is applied to a flat amplifier 4.

The flat amplifier 4 amplifies the read RF signal at a predetermined amplification gain in order to facilitate the signal processing at the succeeding stage because the signal level of the read RF signal from the photodetector 3 is very low. The flat amplifier 4 is comprised of a differential amplifier, etc., and has a flat frequency characteristics. The read RF signal $S_1$ outputted from the flat amplifier 4 is applied to a delay circuit 5 and a subtracting circuit 7. The delay circuit 5 as the delaying means delays the read RF signal $S_1$ by a predetermined time, e.g., a time of one period (1T) of the sampling period for channel bit selection used in the 4/15 demodulation, i.e., a time of one channel clock in FIG. 4. The delay circuit 5 is comprised of a delay line, and a sample-hold circuit, etc. The delayed read RF signal $S_1$ is delivered to an attenuating circuit 6.

The attenuating circuit 6 serving as attenuating means attenuates the amplitude level A of the delayed read RF signal $S_1$ (FIG. 3(b)) into a signal having a predetermined level (FIG. 3(c)). An optimum value of the attenuation coefficient $K_a$ is determined in dependency upon pit forms. It is already known that $K_a$ is set to a value nearly equal to 0.2 as one example to thereby provide a suitable result. The attenuating circuit 6 is constituted by using a multiplier, etc. for setting the gain of the differential amplifier in the attenuating circuit 6 (not illustrated in the drawings) to the above-mentioned attenuation coefficient $K_a$, or for multiplying attenuation coefficient data by a digitalized delayed read RF signal $S_1$, as in a digital attenuator, etc. The attenuated signal $S_2$ thus provided is delivered to the subtracting circuit 7.

The subtracting circuit 7 serving as the subtracting means serves to carry out a subtraction between the read RF signal $S_1$ from the flat amplifier 4 and the subtracted signal $S_2$ from the subtracting circuit 6. This subtraction circuit 7 is constituted by using a differential amplifier, or using a digital subtractor. The subtracted signal $S_3$ indicating a subtracted result is inputted to an A/D converter 8.

The A/D converter 8 is used along with the 4/15 demodulation circuit 9 in order to decode data subjected to 4/15 modulation into data of 8 bits. Demodulation is carried out every byte by the Differential Detection method under control of a system controller 10. The subtracted signal $S_3$ ($=S_1-S_2$) is sampled by using the channel clock as a sampling period at the A/D converter 8 by a playback clock signal CK from the system controller 10. A comparison between sampled data of odd position (on the MSN side) and that of even position (on the LSN side) is made at the 4/15 demodulating circuit 9 to select four channel bits in total of respective two channel bits in order of data level. The selected channel bits are converted by a conversion table stored in a ROM (Read Only Memory) provided in the 4/15 demodulation circuit 9. Thus, output data D out of 8 bits in total of 4 bits on the MSN side and 4 bits on the LSN side, i.e. 1 byte are outputted.

Figure 7:
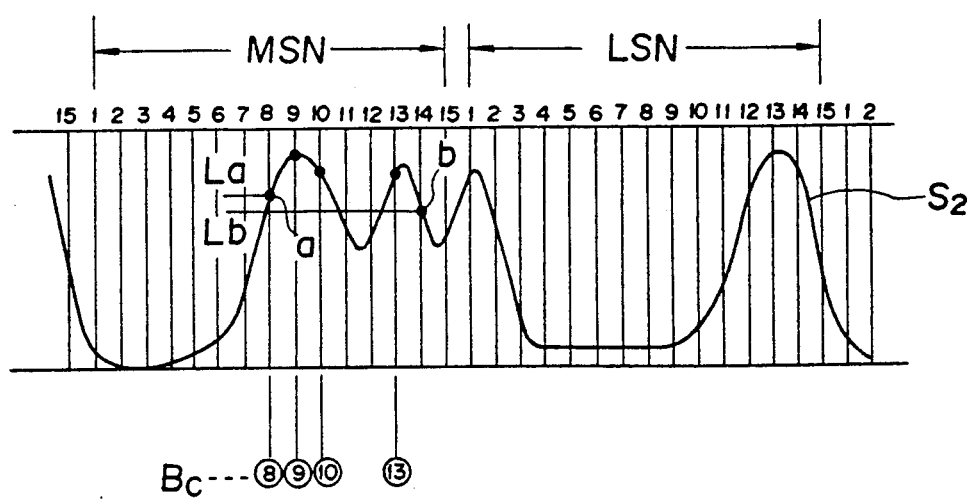
FIG. 7 is an explanatory view showing the effect with the first and second embodiments.

The operation for generating the subtracted signal $S_3$ will now be described with reference to FIG. 3. The RF signal provided by reading the enlarged pit indicated by the solid line $P_1$ by using the photodetector 3 is a RF signal $S_{1E}$ (FIG. 3(b)). This RF signal $S_{1E}$ of enlarged pits is delayed by the delaying circuit 5, and is then attenuated by the attenuating circuit 6, resulting in a attenuated signal $S_2$ (FIG. 3(c)). When the attenuated signal $S_2$ is subtracted from the RF signal $S_{1E}$ at the subtracting circuit 7, the signal waveform of the subtracted signal $S_3$ is as shown in FIG. 3(d). Namely, the falling portion of the RF signal $S_{1E}$ of enlarged pits is attenuated by the attenuation signal $S_2$. As a result, this RF signal has a narrow signal waveform in the time width. This is equivalent to the fact that the enlarged portion of the RF signal $S_{1E}$ of enlarged pits corresponding to the enlarged portion of the solid line $P_1$ is canceled. As stated above, since the read RF signal $S_1$ is necessarily converted to the subtracted signal $S_3$, even if signal pits are enlarged or elongated, there will be conducted a processing equivalent to the processing for RF signal $S_{1C}$ of normal pits provided by reading the broken line $P_0$. As a result, occurrence of errors in reading can be suppressed. The advantages with the above-described first and second embodiments are shown in FIG. 7. Namely, as understood from comparison between FIG. 4 and FIG. 7, the channel bit (14) has a normal level $L_b$ lower than the level $L_a$ of the channel bit (8) as shown in FIG. 7. Thus, a correct channel bit $B_c$ can be outputted.

While explanation has been given by taking an example of a write once read type optical disk as a recording medium in the above-described respective embodiments, as long as the recording format is based on the sampled servo system, any kind of optical disks may be used. For other optical disks, there are enumerated, e.g., E-DRAW such as a magnetooptical disk, or a phase change type optical disk, etc., or a pigment type optical disk, etc. However, optical disks used in this invention are not limited to the above-mentioned optical disks.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A apparatus for reproducing information, comprising:

laser beam irradiation means for irradiating a laser beam onto a recording surface on an information recording medium upon which recorded information is written, photoelectric conversion means for photoelectrically detecting a laser beam reflected from said recording surface to produce a corresponding electric signal such that the recorded information can be reproduced on the basis of said electric signal, signal delaying means for delaying said electric signal by a predetermined time, signal attenuating means for scaling a signal output from said signal delaying means by a predetermined constant factor to produce a delayed and scaled signal, and signal subtracting means for subtracting said delayed and scaled signal from said electric signal to produce as an output a difference signal having a value determined as an algebraic difference between said electric signal and said delayed and scaled signal.

2. An apparatus for reproducing information, comprising:

laser beam irradiation means for irradiating a laser beam onto a recording surface on an information recording medium upon which recorded information is written, photoelectric conversion means for photoelectrically detecting a laser beam reflected from said recording surface and producing a corresponding electric signal, signal delaying means for delaying said electric signal by a predetermined time, signal attenuating means for scaling a signal output from said signal delaying means by a predetermined constant factor to produce a delayed and scaled signal, signal subtracting means for subtracting said delayed and scaled signal from said electric signal to produce an output difference having a value determined as an algebraic difference between said electric signal and said delayed and scaled signal, signal sampling means for sampling an amplitude level of at least one of said electric signal and said difference signal at a predetermined sampling period, and signal extraction means for extracting a plurality of electric signals from said signal sampling means.

3. An apparatus for reproducing information as set forth in claim 2, wherein said predetermined time by said signal delaying means is a time corresponding to one period of said sampling period.

4. An apparatus for reproducing information, comprising:

laser beam irradiation means for irradiating a laser beam onto a recording surface on a write once read type optical disk, where information modulated by a 4/15 modulation method is recorded on the recording surface of said optical disk, photoelectric conversion means for photoelectrically detecting a laser beam reflected from said recording surface and producing a corresponding electric signal, signal delaying means for delaying said electric signal by a predetermined time, signal attenuating means for scaling a signal output from said signal delaying means by a predetermined constant factor to produce a delayed and scaled signal, signal subtracting means for subtracting said delayed and scaled signal from said electric signal to produce an output difference having a value determined as an algebraic difference between said electric signal and said delayed and scaled signal, and demodulating means for demodulating at least one of said electric signal and said difference signal by a 4/15 demodulation method.

5. An apparatus for reproducing information as set forth in claim 4, wherein said demodulating means samples an amplitude level of at least one of said electric signal and said subtraction signal by using channel clocks of 15 channels to select four signals to reproduce said recorded information on the basis of said selected signals.

6. An apparatus for reproducing information as set forth in claim 5, wherein said predetermined time by said signal delaying means is a time corresponding to a playback clock signal from a system controller.

* * * * *